(12) United States Patent
Zelmanovich et al.

(10) Patent No.: US 6,347,229 B1
(45) Date of Patent: Feb. 12, 2002

(54) METHOD FOR TRACKING THE LOCATION OF MOBILE UNITS

(75) Inventors: Helena Zelmanovich; Victor Zelmanovich, both of Deer Park, NY (US); George Bilenko, Stamford, CT (US)

(73) Assignees: Intech 21, Inc., Glen Cove, NY (US); Secure Care Products, Inc., Concord, NH (US)

( * ) Notice: Subject to any disclaimer, the term of this patent is extended or adjusted under 35 U.S.C. 154(b) by 0 days.

(21) Appl. No.: 09/383,812

(22) Filed: Aug. 26, 1999

(51) Int. Cl.$^7$ .................................................. H04Q 7/20
(52) U.S. Cl. ...................................... 455/456; 455/562
(58) Field of Search ................................ 455/456, 457, 455/562, 139, 132, 440, 522, 423; 342/450

(56) References Cited

U.S. PATENT DOCUMENTS

| | | | | | |
|---|---|---|---|---|---|
| 4,728,959 A | * | 3/1988 | Maloney | ...................... | 342/457 |
| 5,973,643 A | * | 10/1999 | Hawkes | ...................... | 342/457 |
| 5,991,284 A | * | 11/1999 | Willenagger | ................. | 370/335 |
| 6,026,304 A | * | 2/2000 | Hilsenrath | ................... | 455/456 |
| 6,026,305 A | * | 2/2000 | Salinger | ..................... | 455/456 |
| 6,047,192 A | * | 4/2000 | Maloney | ..................... | 455/456 |
| 6,091,956 A | * | 7/2000 | Hollenberg | ................. | 455/456 |
| 6,163,696 A | * | 12/2000 | Bi | ............................... | 455/436 |
| 6,167,275 A | * | 12/2000 | Oros | .......................... | 455/456 |
| 6,208,297 B1 | * | 3/2001 | Fattouche | ................... | 342/450 |
| 6,233,459 B1 | * | 3/2001 | Sullivan | ..................... | 455/456 |
| 6,252,867 B1 | * | 6/2001 | Pfeil | .......................... | 370/335 |

* cited by examiner

*Primary Examiner*—Daniel Hunter
*Assistant Examiner*—Nick Corsaro
(74) *Attorney, Agent, or Firm*—Ira J. Schaefer, Esq.; Clifford Chance Rogers & Wells LLP (57) ABSTRACT

A method for tracking the location of mobile units, comprises providing a plurality of mobile units each having a wireless transmitter and a unique address and at least one stationary base unit having a phase array antenna with antenna elements. A signal including an address is received from at least one mobile unit by the at least base unit via the phase array antenna. The phase difference of the signal arriving at the antenna elements from each mobile unit is measured and the coordinates of the location of each mobile unit are calculated as a function of the phase differences.

21 Claims, 6 Drawing Sheets

METHOD FOR TRACKING THE LOCATION OF MOBILE UNITS

BACKGROUND OF THE INVENTION

The present invention relates to a method for tracking the location of mobile units.

There is currently a great need for the tracking of the location of mobile units, particularly wireless transmitters or transceivers that are worn or carried on a person, so as to keep track of that person's location. The mobile units also can have sensors which sense voltage, temperature, vital signs, etc., and thus it is also important for the mobile unit to be able to transmit this information under adverse conditions.

Many problems arise from the use of such units, particularly where many units are present in a given area, and there is a need to accurately identify each individual unit, as well as to accurately identify the location of the unit.

SUMMARY OF THE INVENTION

The main object of the present invention is to provide a method for tracking the location of mobile units which is achieved by calculating the coordinates of the location of a mobile unit with a unique identification.

Another object of the present invention is to calculate the coordinates of the location of each mobile unit by measuring the phase difference of signals arriving at antenna elements of a phase array antenna at the base unit from a mobile unit.

Preferably, measuring of the phase difference is performed in the base unit, whereas the step of calculating the coordinates is performed in a main unit connected to the base unit and comprising a programmable computer, for example, an Intel Pentium II based personal computer having a Windows 98 operating system, or any kind of programmable computer system.

Each mobile unit may have one or more sensors, and the signal that is received from the mobile unit includes information or an information signal, may include an output from the sensor and a mobile unit address (identification number). The information from the sensor is processed preferably by the main unit.

The wireless transmitter or transceiver used in the mobile unit is preferably a radio frequency transmitter, and more preferably, a radio frequency transceiver.

Another object of the present invention is to improve the tracking method by a method for calibrating a system for tracking the location of mobile units.

Still another object of the present invention is to improve the accuracy of the location tracking by providing two or more base units disposed at a predetermined position apart from each other and measuring the azimuth of the signal received from each mobile unit at the antenna elements of the base units.

In accordance with the present invention, the base unit or phase difference measurement and communication unit (PDMCU) has the phase array antenna for receiving signals from a plurality of mobile wireless transmitter units or portable wireless interfaces (PWI) and at least one reference wireless transmitter or beacon is disposed at a fixed location. The beacon is at a known location with regard to the base unit and has a unique identifying address which identifies it as a beacon or reference unit.

A signal including the address is received from the beacon at the base unit via the phase array antenna. The phase difference between the signal arriving at the antenna elements from the beacon is measured and the coordinates of the location of the beacon are then calculated. Future calculations can then be corrected by the difference between the calculated coordinates of the beacon and the actual location of the beacon. Thus, when calculations are performed thereafter for mobile units, similar corrections can be performed to the calculated coordinates in order to find the actual location of those mobile units.

To further increase accuracy of the location detection, a plurality of base units can be used. In this case, the locations of the base units are known and each base unit will measure the azimuth direction of the mobile unit.

These and other objects and advantages of the present invention are achieved in accordance with the present invention disclosed in detail hereinafter with reference to the attached drawings, wherein

DETAILED DESCRIPTION OF THE INVENTION

Figure 1:
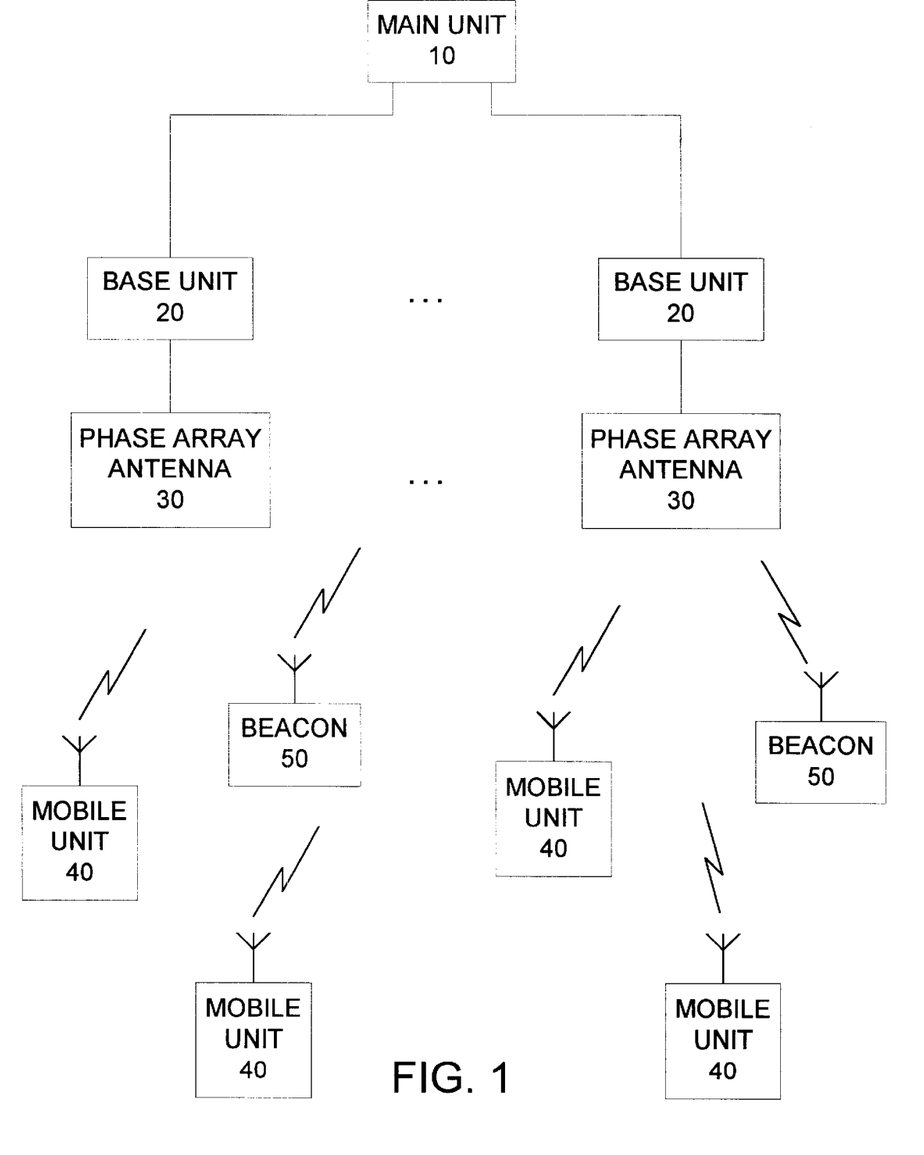
FIG. 1 is a block diagram of the system for carrying out the method of the present invention.

Referring now to FIG. 1, a system is shown for carrying out the method of the present invention for the detection of the location and identification of mobile units 40 by the use of a phase array antenna 30.

The system may have a single base unit 20, but preferably has a plurality of addressable base units each with antenna elements in a phase antenna array 30. The base unit receives a signal from a mobile unit or beacon 50 at each antenna element. There will be a resulting phase difference and the function of the base unit is to measure the phase difference and communicate it to main unit 10. The function of the main unit is to process information from the base units and mobile units and communicate the information. The base units 20 are connected to the main unit or computation and communication module 10 in a hard-wired manner as shown in FIG. 1 or through a wireless connection. Moreover, while the base units 20 are shown to be connected in parallel, they can also be connected via a network to the main unit 10. While a single main unit is shown, it is understood that the system can include a plurality of main units each having base units connected thereto. In the various system configurations that have been described, each base unit has a unique address that is sent to the main unit with all transmissions and this unique address also permits each base unit to be addressable by the main unit.

The main unit 10 is preferably a programmed microcomputer, such as an Intel Pentium II based computer having Windows 98 operating system plus a network controller module which serves as an interface between the base units and the computer.

The base unit comprises a circuitry for measuring the phase difference of the signals arriving from the mobile units 40 or from a beacon 50, as well as having circuitry for information data detection from each mobile unit 40 or beacon 50. The base units 20 also have the ability to communicate with the main unit 10, either by means for of a driver along a hard-wire line or by means of a radio transceiver for wireless communication.

The system also includes the aforementioned mobile or portable wireless interface units 40 of which any number can be used, as long as each has a unique address which it is capable of communicating to the base units 20. The mobile units include a transmitter, preferably a radio frequency transceiver, as well as any number of a set of sensors that can be used to make telemetry readings. The outputs of the sensors are communicated via the transmitters to base units and thereafter to the main unit so as to be processed therein.

The main unit 10, which is preferably a computation and communication module, as noted above, comprises a programmed personal computer and utilizes software for the portable wireless interface unit location calculation and database management for storing the sensor readings, along with the locations for each mobile unit 40.

The system also includes beacons 50 which are fixed location wireless transmitters or transceivers, whose location relative to the phase array antenna of the base units 20 are known to the main unit 10. The system can use one or more beacons 50, depending upon the environment, that is, if the signals therefrom would be blocked from the various phase array antennas 30.

In accordance with the invention, once there is a measurement in the base unit 20 of the phase difference of the signal received from a mobile unit 40, the main unit 10 will calculate the coordinates of the location and process the data from the sensors.

The method according to the present invention combines the location and identification of any mobile unit by using multiple phase array antennas and transfers the collected information to an information management system in the main unit which can also collect and process the information from sensors attached to the mobile units 40.

Figure 2A:
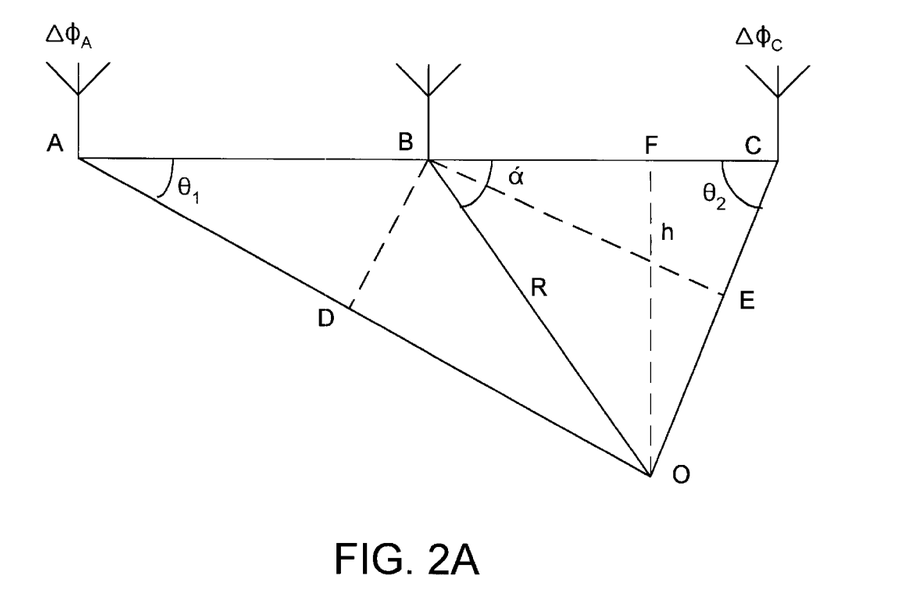
FIG. 2A is a drawing showing the method for calculating the polar coordinates.

Referring now to FIG. 2A, the calculation of the polar coordinates R, α of a tracked object is explained using the phase array antenna in a radio frequency identification type system.

As shown in FIG. 2A, O is the tracked object with a transmitter or transceiver and A, B and C are antenna elements. It has been found that the location can be determined by using just two antenna elements when at least two base units are used.

The base unit 20 measures the phase difference of points A,C relative to point B ($\Delta\Phi_A$, $\Delta\Phi_C$) electronically at points A and C respectively.

In accordance with the invention, the antenna elements can be positioned in such a way that, for example, λ/2 or any needed distance for a particular application. For example AB=BC=λ/2 or
AB=BC=λ
or any other desired value.

As a result $$\Delta\Phi_A = \frac{2\pi AD}{\lambda}$$

$$\Delta\Phi_C = \frac{2\pi EC}{\lambda}$$

From these equations, if $\Phi_A$ and $\Phi_C$ are known, then the angles $\theta_1$ and $\theta_2$ can be calculated, as we can see from the following example.

If we assume that
AB=BC=λ
λ<<OB
λ<<OA
λ<<OC
$\Delta\Phi_A$=90°=π/2
then $$AD = \frac{\Phi_A \lambda}{2\pi} = \frac{\lambda}{4}$$

$$\cos\theta_1 = \frac{AD}{AB} = \frac{\lambda}{4\lambda} = \frac{1}{4}$$

$$\theta_1 = 75.5°$$

Once angles $\theta_1$ and $\theta_2$ are known, then
OF=h
FC=x
AF=2λ−x h=x tan $\theta_2$ h=(2λ−x)tan $\theta_1$ x tan $\theta_2$=2λ tan $\theta_1$−x tan $\theta_1$ x(tan $\theta_1$+tan $\theta_2$)=2λtan $\theta_1$ $$x = \frac{2\lambda\tan\theta_1}{\tan\theta_1 + \tan\theta_2}$$

h=x tan $\theta_2$ $$h = \frac{2\lambda\tan\theta_1\tan\theta_2}{\tan\theta_1 + \tan\theta_2}$$

Then the radius vector R can be determined as follows

R=OB=√((λ−x)²+h²)

$$R = OB = \sqrt{(\lambda - x)^2 + h^2}$$

$$\tan\alpha = \frac{h}{\lambda - x}$$

The polar coordinates R, α define the exact location of a tracked object at any given moment in time.

Multiple base units can measure the azimuth of the same mobile unit from different locations and transmit this information to the main unit. In this case, the main unit can provide better accuracy of the location coordinates for the mobile units.

Figure 2B:
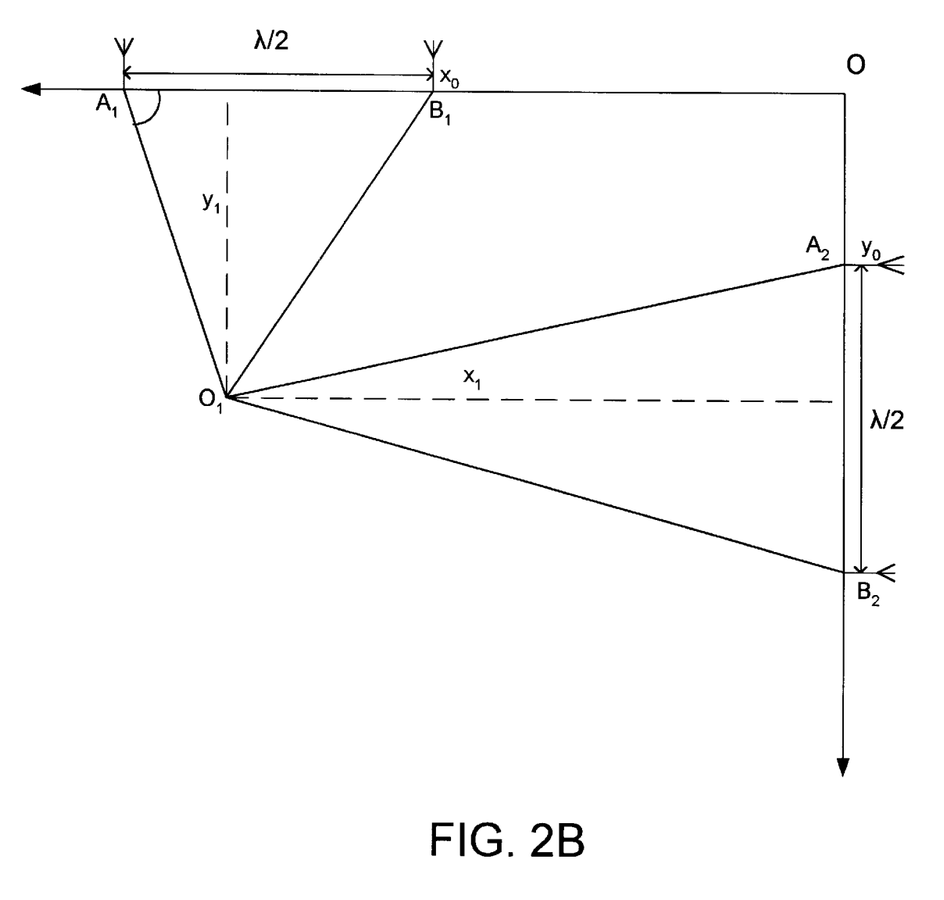
FIG. 2B is a drawing showing the method for calculating the X, Y coordinates.

The coordinate calculations for an object position using two phase array antennas, each with two antenna elements when the distance between the elements is λ/2 is now explained with the help of FIG. 2B.

The following are known: $B_1(x_0,0), A_2(0,y_0), \theta_1, \theta_2$. The problem is to find $O_1(x_1,y_1)$.

$$\frac{y_1}{\frac{\lambda}{2}-(x_1-x_0)} = \tan\theta_1$$

$$y_1 = \left(\frac{\lambda}{2} - x_1 + x_0\right)\tan\theta_1$$

$$y_1 = \left(\frac{\lambda}{2} + x_0\right)\tan\theta_1 - x_1\tan\theta_1$$

$$\frac{x_1}{y_0 - y_1} = \tan\theta_2$$

$$x_1 = (y_0 - y_1)\tan\theta_2$$

$$x_1 = y_0\tan\theta_2 - y_1\tan\theta_2$$

$$y_1 = \left(\frac{\lambda}{2} + x_0\right)\tan\theta_1 - y_0\tan\theta_1\tan\theta_2 + y_1\tan\theta_1\tan\theta_2$$

$$y_1 = \frac{\tan\theta_1\left(\frac{\lambda}{2} + x_0 - y_0\tan\theta_2\right)}{1 - \tan\theta_1\tan\theta_2}$$

$$x_1 = \tan\theta_2\left[y_0 - \frac{\tan\theta_1\left(\frac{\lambda}{2} + x_0 - y_0\tan\theta_2\right)}{1 - \tan\theta_1\tan\theta_2}\right]$$

The last two equations represent the coordinates of the tracked object $O_1$ by using two phase array antennas and are expressed through given quantities $x_0, y_0, \theta_1, \theta_2$.

Figure 3:
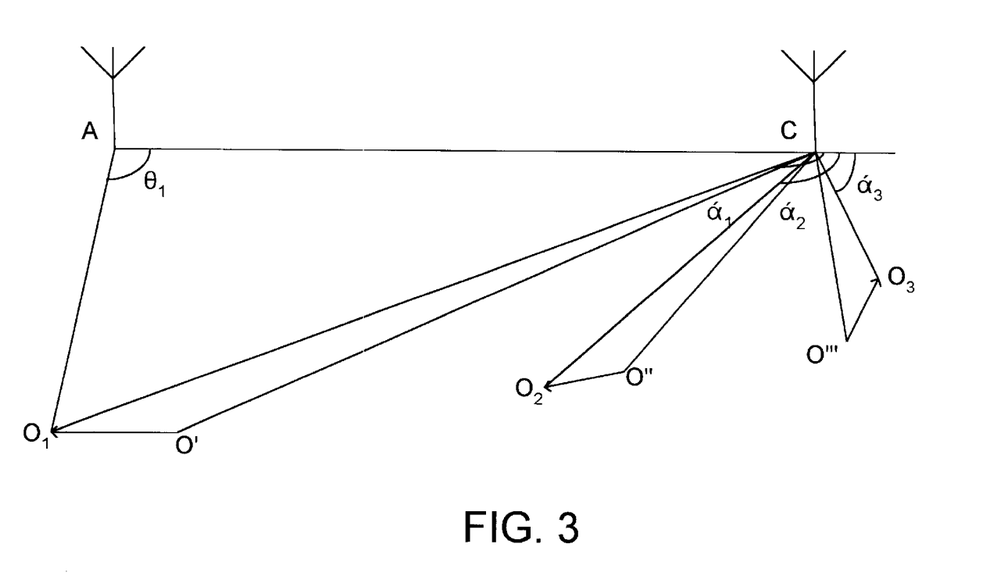
FIG. 3 is a drawing showing the calculation of the calibration corrections.

FIG. 3 shows how the beacon 50 can be used for the calibration of the radio frequency identification system.

One or more beacons are positioned in a constant position, so that the exact locations, that is, their coordinates, are defined by the needed application and are known. In this example the polar coordinates are used, but it is understood that it is equally applicable to other coordinates.

$O_1$ and $O_2$ and $O_3$ are the actual positions of the beacon, whereas O', O" and O'" are points from which the electronic signals were calculated as being received.

A number of electronic measurements are taken for the position of the beacon. They are then averaged, and then one calculates the average of $\Delta O_1, \Delta O_2$ and $\Delta O_3$ and the final average $\Delta O$ will be used for calibration and accounted for in $\Delta\Phi_A$ and $\Delta\Phi_B$.

| BEACON AT | $R_{BEACON}$ | $\alpha_{BEACON}$ | SIGNAL FROM | DISPLACEMENT VECTOR |
|---|---|---|---|---|
| $O_1$ | $R_1$ | $\alpha_1$ | O' | $\vec{O'O_1} = \Delta O_1$ |
| $O_2$ | $R_2$ | $\alpha_2$ | O" | $\vec{O"O_2} = \Delta O_2$ |
| $O_3$ | $R_3$ | $\alpha_3$ | O'" | $\vec{O'"O_3} = \Delta O_3$ |

Figure 4:
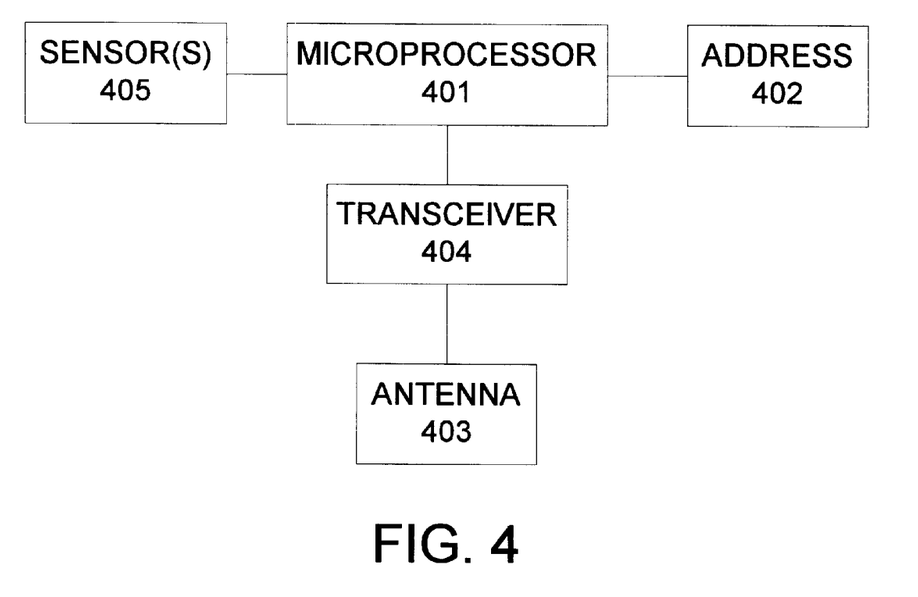
FIG. 4 is a block diagram of the mobile units of FIG.

FIG. 4 shows the details of the mobile unit 40. The unit includes a microprocessor 401 which receives inputs from one or more sensors 405 and which has a hard-wired address 402 which is unique and which is received by the microprocessor 401.

The microprocessor 401 controls transceiver 404 which communicates via antenna 403 with the base units 20. The microprocessor 401 controls the transceiver so as to transmit the sensor information, along with the address information, and to receive polling information from the base units 20.

Figure 5:
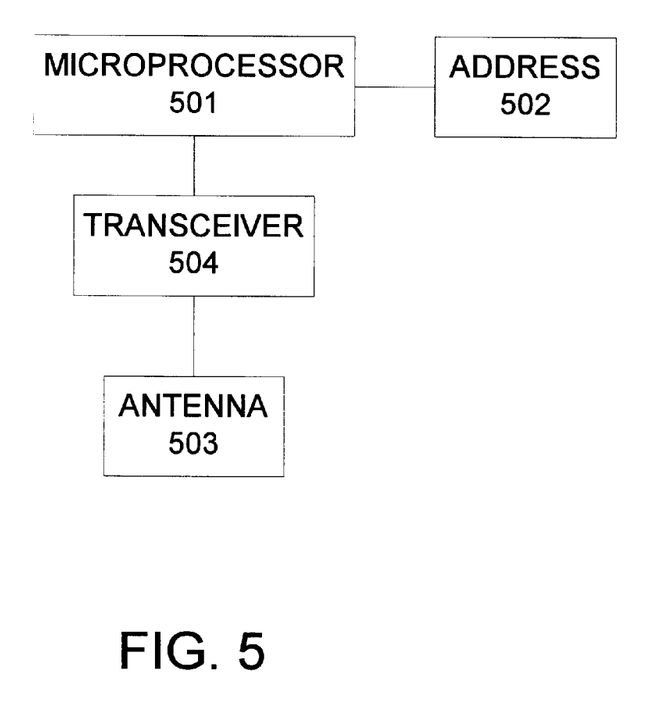
FIG. 5 is a block diagram of the beacon of FIG. 1.

The details of the beacon 50 are shown in FIG. 5. The beacon 50 includes a microprocessor 501 which receives, as an input, a unique address from 502 which identifies the beacon as a reference source, as opposed to a portable wireless interface unit 40. The microprocessor 501 controls the transceiver 504 to transmit a reference signal, along with the address, via antenna 503. The beacon can also have a sensor connected to it.

The transceivers 404 and 504 can be an RFM TR3001 transceiver, a Linx TXN-315-LC transmitter of comparable device from Motorola, Airnet, Intellon or Proxim. Microprocessors 401 and 501 can be conventional Intel, Motorola microprocessors or others.

The sensors 405 can sense telemetry information such as current, flow, leakage, motion, pressure, smoke, temperature, vibration, vital signs, and voltage.

Figure 6:
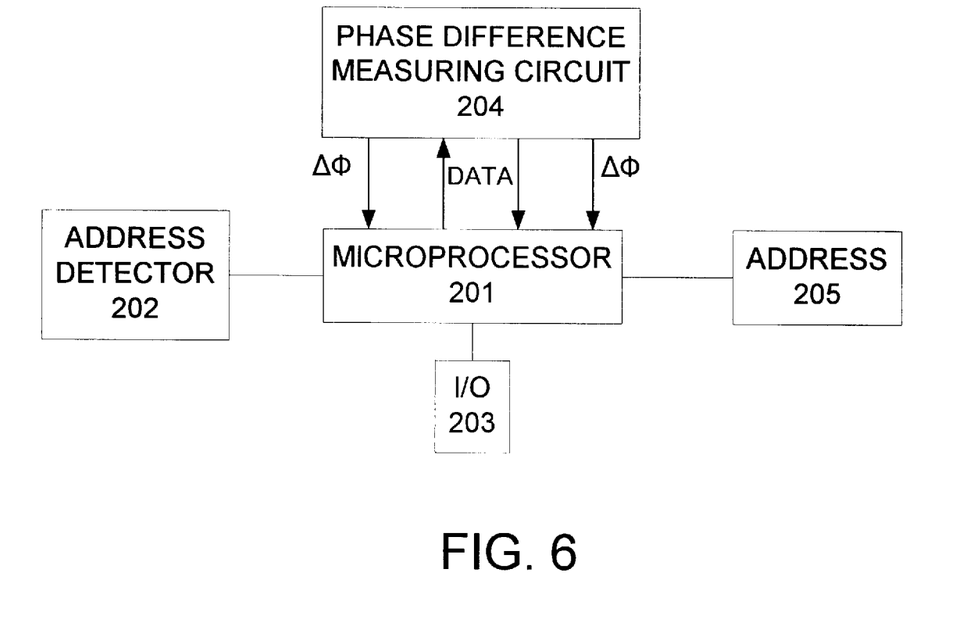
FIG. 6 is a block diagram of the base units of FIG. 1.

FIG. 6 shows the details of the base unit 20. This unit is controlled by a microprocessor 201 which receives, for example, the phase difference signals $\Delta\Phi_A$ and $\Delta\Phi_C$ from phase difference measurement circuit 204. The signals, along with the address data, are processed by the microprocessor which sends the address data to the address detector 202 to determine the source of the signal. The base unit also has a unique address which is stored in 205 and which is sent along with data to the main unit. The microprocessor 201 communicates with the main unit 10 via the I/O 203. The I/O 203 can be either a UART for transmitting asynchronous data to the main unit 10, either in parallel, as shown in FIG. 1, or via a network, or it can be a transceiver transmitting the information including the address to and from the main unit via wireless communication.

Figure 7:
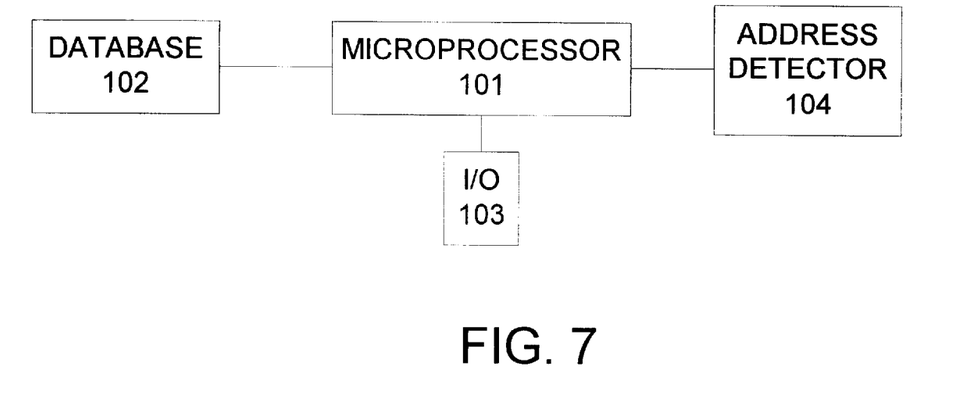
FIG. 7 is a block diagram of the main unit of FIG. 1.

FIG. 7 illustrates the main unit 10. The main unit 10, as noted above, can be a programmed microcomputer, including a microprocessor 101 and an I/O 103 which is managing the wired or wireless network with I/O 203 of the base unit 20. The main unit 10 also includes a database 102 in which the information from the sensors is stored, along with the location and identification of each mobile unit. The main unit has an address detector 104 which determines which base unit it is receiving data from. Microprocessors 101 and 201 can be conventional Intel, Motorola microprocessors or others.

Figure 8:
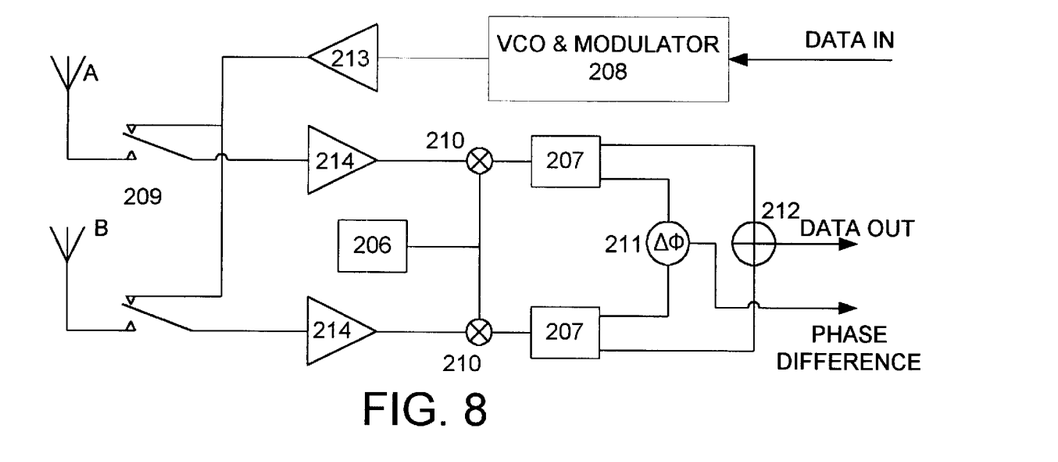
FIG. 8 is a drawing of a phase difference measurement circuit in the base unit.

FIG. 8 illustrates the phase difference measurement circuit 204 that is used to measure each phase difference. In the circuit shown, two antenna elements A and B are used and the phase difference $\Delta\phi$ is measured and sent to microprocessor 201. The circuit has a voltage controlled oscillator and modulator 208 which is a surface acoustic wave or phase lock loop based. Data from the main unit 10 used to poll the mobile unit or beacon is input and passed through amplifier 213 to switch 209 which connects the signal to antenna elements A and B for transmission to the mobile units and/or beacons.

When a signal is received at the antenna elements A and B, the switch 209 is set in the receive position and the signals are passed through low noise amplifiers 214 to mixers 210 where the signals are mixed with an output from local oscillator 206, which is a surface acoustic wave or phase lock loop based oscillator by Temic or Atmel. The output of the mixers is received by intermediate frequency receivers 207 which are for example NE605 by Philips. The data demodulated from the signals are combined at 212 to improve gain and constitute the data out signal sent to the microprocessor 201. The directional signals are fed to phase difference detector 211 which is a 74HCT9046. The output is the phase difference sent to microprocessor 201.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for continuous tracking the location of mobile units, comprising the steps of:
providing at least one mobile unit having a wireless transceiver and a unique address;
providing at least one stationary base unit having a phase array antenna with three or more single antenna elements, where said stationary base unit periodically polls said at least one mobile unit to trigger transmission of at least one signal from said mobile unit to said stationary base unit;
receiving said signal, including an address from said mobile unit at said stationary base unit via said phase array antenna;
measuring the phase difference of said signal arriving at said three or more antenna elements of said phase array antenna;
performing calculations by expressing the phase difference at a plurality of points of location of said antenna elements of said stationary base unit relative to at least one other point of location of another antenna element of the same stationary base unit; and
determining the location of each at least one mobile unit using a single one of the at least one stationary unit by determining azimuths of each mobile unit from the phase differences at a plurality of points of said single antenna elements of the single base unit and calculating the polar coordinates of intersections of the azimuths.

2. The method according to claim 1, further comprising a step of transmitting said calculated coordinates of said mobile unit from said at least one stationary base unit to a main unit.

3. The method according to claim 2, further comprising a step of adjusting said calculated coordinates of said mobile unit using an environmental data.

4. The method according to claim 3, wherein said environmental data comprises a floor plan.

5. The method according to claim 2, further comprising a step of adjusting said calculated coordinates of said mobile unit using a location coordinates of said mobile calculated by a different stationary base unit.

6. The method according to claim 2, wherein said transmission of said calculated coordinates is wireless.

7. The method according to claim 2, wherein said main unit is connected to said at least one stationary base unit.

8. The method according to claim 1, wherein the calculations are performed in a stationary base unit.

9. The method according to claim 2, wherein the calculations are performed in a main unit.

10. The method according to claim 2, wherein each mobile unit has at least one sensor and a signal transmitted to said main unit includes an information signal from said sensor, and wherein the information signal is processed by said main unit.

11. The method according to claim 1, further comprising a step of providing at least one wireless portable reference transceiver disposed at a fixed location and having a unique identifying address and calibrating the accuracy of the calculation of the coordinates of at least one mobile unit using the known location of said portable reference transceiver.

12. The method according to claim 11, wherein the step of calibrating comprises
measuring the phase difference between the signal arriving at each of a plurality of antenna element from at least one portable reference transceiver;
performing calculations at said stationary base unit by expressing the phase difference at a plurality of points of location of said antenna elements of said stationary base unit relative to at least one other point of location of another antenna element of the same stationary base unit;
determining from said phase differences the coordinates of location of said portable reference transceiver; and
correcting future calculations of the coordinates of at least one mobile unit by the difference between the calculated coordinates of said portable reference transceiver and the actual location of said portable reference transceiver.

13. The method according to claim 12, wherein said portable reference transceiver has at least one sensor.

14. A method for calibrating a system for continuous tracking the location of mobile units, comprising the steps of:
providing at least one stationary base unit with a phase array antenna having antenna elements for receiving signals from a plurality of mobile wireless transceiver units and at least one wireless portable reference transceiver disposed at a fixed location and having a unique identifying address;
receiving a signal including an address from said wireless portable reference transceiver at said stationary base unit via a phase array antenna;
measuring the phase difference of said signal arriving at a plurality of antenna elements of said phase array antenna;
performing calculations by expressing the phase difference at a plurality of points of location of said antenna elements of said stationary base unit relative to at least one other point of location of another antenna element of the same stationary base unit;
determining from said phase differences the coordinates of location of said portable reference transceiver; and
correcting future calculations of the coordinates of the mobile wireless transceiver units by the difference between the calculated coordinates of said portable reference transceiver and the actual location of said portable reference transceiver.

15. The method according to claim 14, wherein at least one stationary base unit periodically polls at least one mobile unit to initiate a signal transmission from said mobile unit to said stationary base unit.

16. The method according to claim 14, wherein the coordinates of location of said mobile unit are expressed as polar coordinates.

17. The method according to claim 14, further comprising a step of transmitting said calculated coordinates of location of said wireless portable reference transceiver from said stationary base station to a main unit.

18. The method according to claim 17, wherein said transmission of said calculated coordinates is wireless.

19. The method according to claim 17, wherein said main unit is connected to said at least one stationary base unit.

20. The method according to claim 14, wherein the step of performing calculations by expressing the phase difference at a plurality of points of location of said antenna elements of said stationary base unit relative to at least one other point of location of another antenna element of the same stationary base unit and the step of determining from said phase differences the coordinates of location of said wireless portable reference transceiver are performed in a stationary base unit.

21. The method according to claim 17, wherein the step of performing calculations by expressing the phase difference at a plurality of points of location of said antenna elements of said stationary base unit relative to at least one other point of location of another antenna element of the same stationary base unit and the step of determining from said phase differences the coordinates of location of said wireless reference transceiver are performed in a main unit.

* * * * *